US009798762B2

(12) United States Patent
Hazlewood et al.

(10) Patent No.: US 9,798,762 B2
(45) Date of Patent: Oct. 24, 2017

(54) REAL TIME BIG DATA MASTER DATA MANAGEMENT

(71) Applicant: International Business Machines Corporation, Armonk, NY (US)

(72) Inventors: Stephanie J. Hazlewood, Toronto (CA); Allan L. Luo, Markham (CA); Amira N. Taiyab, Maple (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/954,140

(22) Filed: Nov. 30, 2015

(65) Prior Publication Data

US 2017/0154067 A1   Jun. 1, 2017

(51) Int. Cl.
*G06F 7/00*   (2006.01)
*G06F 17/00*   (2006.01)
*G06F 17/30*   (2006.01)

(52) U.S. Cl.
CPC .............................. *G06F 17/30371* (2013.01)

(58) Field of Classification Search
None
See application file for complete search history.

(56) References Cited

U.S. PATENT DOCUMENTS

| | | | |
|---|---|---|---|
| 6,285,997 B1 * | 9/2001 | Carey | G06F 17/30457 |
| 7,660,782 B2 | 2/2010 | Andrews | |
| 8,195,698 B2 | 6/2012 | Wasserman et al. | |
| 8,635,249 B2 | 1/2014 | Anand et al. | |
| 2007/0239557 A1 * | 10/2007 | Phillips | G06Q 10/00 705/26.82 |
| 2009/0171991 A1 * | 7/2009 | Gitai | G06F 17/30292 |
| 2012/0233122 A1 * | 9/2012 | Briet | H04L 67/1095 707/634 |
| 2014/0149583 A1 * | 5/2014 | Gil | G06Q 50/01 709/224 |
| 2014/0250153 A1 | 9/2014 | Nixon et al. | |

(Continued)

FOREIGN PATENT DOCUMENTS

| | | |
|---|---|---|
| CN | 103491187 A | 1/2014 |
| WO | 2013070873 A1 | 5/2013 |

OTHER PUBLICATIONS

Mran et al., "A Layer Based Architecture for Provenance in Big Data", 2014 IEEE International Conference on Big Data, pp. 29-31, © 2014 IEEE, 978-1-4799-5666-1/14.

(Continued)

*Primary Examiner* — Jau-Shya Meng
(74) *Attorney, Agent, or Firm* — Brian M. Restauro (57) ABSTRACT

Methods, computer program products, and systems for real time processing of large data sets are disclosed. A large data set from a plurality of sources can be imported to a batch layer by one or more processors of a computer system comprising the batch layer, a view layer, and a cache layer. These methods, computer program products, and systems can be used to create a view in the view layer depicting a subset of the imported large data set and responsive to receiving a user request to change at least a portion of the subset depicted in the view, copying the view to the cache layer and changing the copy of the view at the cache layer according to the received user request and can then synchronize the changed copy of the view with the view at the view layer.

20 Claims, 7 Drawing Sheets

(56) References Cited

U.S. PATENT DOCUMENTS

2014/0257991 A1* 9/2014 Christensen ....... G06Q 30/0241
                                                      705/14.66
2014/0379761 A1* 12/2014 Adamson .......... G06F 17/30563
                                                      707/811
2015/0127606 A1   5/2015  Hazlewood et al.
2015/0127609 A1   5/2015  Hazlewood et al.
2015/0324359 A1  11/2015  Luo et al.
2015/0324486 A1  11/2015  Luo et al.

OTHER PUBLICATIONS

McKnight, William, "MDM and Big Data, from Batch to Real-Time", Jan. 22, 2012, CA ERwin, pp. 1-2, <http://erwin.com/community/expert-blogs/mdm-and-big-data-from-batch-to-real-time/>.

Walker, Michael, "Lambda Architecture for Big Data Systems", Data Science Central—The Online Source for Big Data Practioners, pp. 1-4, <http://www.datasciencecentral.com/profiles/blogs/lambda-architecture-for-big-data-systems>.

"Distributed Probabilistic Matching", An IP.com Prior Art Database Technical Disclosure, Authors et. al.: Disclosed Anonymously, IP.com No. 000232391, 5 pages.

* cited by examiner

REAL TIME BIG DATA MASTER DATA MANAGEMENT

BACKGROUND

The present invention relates generally to the field of master data management systems, and more particularly to real time processing in master data management environments.

Master data management (MDM) is a comprehensive method of enabling an enterprise to link all of its critical data to one file, called a master file or a data set that provides a common point of reference. Master data management streamlines data sharing and facilitates computing in multiple system architectures, platforms and applications. The typical goal of master data management is to provide the end user community with a "trusted single version of the truth" from which to base decisions.

Generally, analytic processes can be run against a data set (e.g., a copy of a data source or a generated data set). Typically, a virtual approach to MDM involves a write-once, read-many-times pattern. A centralized or transactional approach (e.g., physical MDM) requires real time read, add, and update processing against a given data set.

SUMMARY

Embodiments of the present invention provide methods, computer program products, and systems for real time processing of large data sets. In one embodiment of the present invention, a method is provided comprising: importing to a batch layer, by one or more processors of a computer system comprising the batch layer, a view layer, and a cache layer, a large data set from a plurality of sources; creating a view in the view layer depicting a subset of the imported large data set; responsive to receiving a user request to change at least a portion of the subset depicted in the view, copying the view to the cache layer; changing the copy of the view at the cache layer according to the received user request; and synchronizing the changed copy of the view with the view at the view layer.

DETAILED DESCRIPTION

Embodiments of the present invention recognize the need for online real time processing for master data management. Typically, efficient data processing patterns in master data management systems employ a write once, read many times pattern, which can be time consuming for big data management. Embodiments of the present invention provide efficient solutions for real time processing of large data sets. In this manner, as discussed in greater detail in this specification, embodiments of the present invention can be used to provide fast responses to real-time data requests while concurrently handling batch processing. In other words, embodiments of the present invention can be used to determine which data sets and records to cache which enables quick retrieval to support transactional updates in a master data management system that leverages large data sets.

Figure 1:
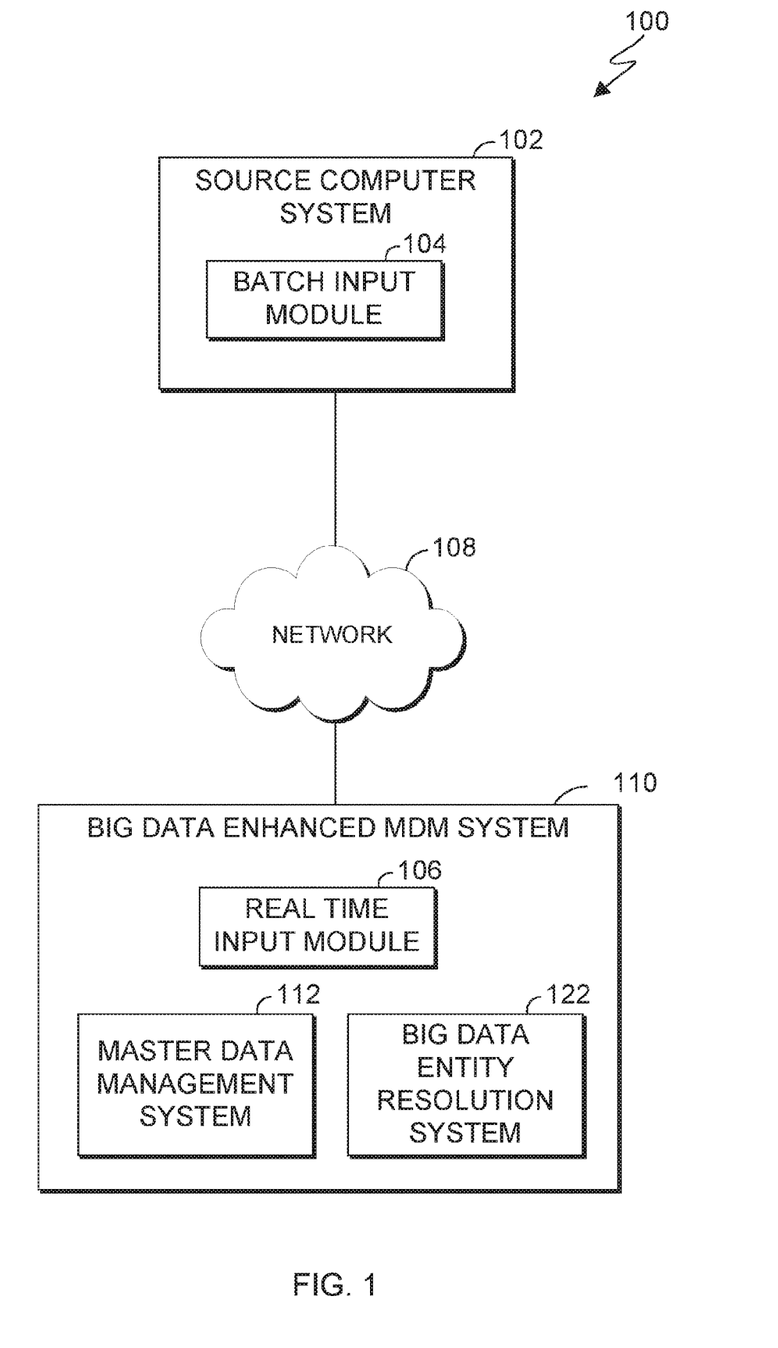
FIG. 1 is a block diagram of a computing environment, in accordance with an embodiment of the present invention.

FIG. 1 is a functional block diagram of computing environment 100, in accordance with an embodiment of the present invention. Computing environment 100 includes source computer system 102 and big data enhanced MDM system 110 connected to network 108. Source computer system 102 and big data enhanced MDM system 110 can be desktop computers, laptop computers, specialized computer servers, or any other computer systems known in the art. In certain embodiments, source computer system 102 and big data enhanced MDM system 110 represent computer systems utilizing clustered computers and components to act as a single pool of seamless resources when accessed through network 108. For example, such embodiments may be used in data center, cloud computing, storage area network (SAN), and network attached storage (NAS) applications. In certain embodiments, source computer system 102 and big data enhanced MDM system 110 represent virtual machines. In general, source computer system 102 and big data enhanced MDM system 110 are representative of any electronic devices, or combination of electronic devices, capable of executing machine-readable program instructions, as described in greater detail with regard to FIG. 8.

Source computer system 102 includes batch input module 104. Batch input module 104 provides input to big data enhanced MDM system 110. In certain embodiments, batch input module 104 can be one or more databases containing information. For example, information can be customer data, user profiles, financial profiles, account information, etc.

Network 108 can be, for example, a local area network (LAN), a wide area network (WAN) such as the Internet, or a combination of the two, and include wired, wireless, or fiber optic connections. In general, network 108 can be any combination of connections and protocols that will support communications between computer system 102 and big data enhanced MDM system 110, in accordance with a desired embodiment of the invention.

Big data enhanced MDM system 110 receives data inputs from batch input module 104 and performs batch data processing to process, link, and create single views of respective data sets, and determines which data sets to record to cache. Big data enhanced MDM system 110 includes real time input module 106 and master data management system 112 and big data entity resolution system 122. Real time input module 106 interacts with source computer system 102 to handle a real time request other than a batch input. In this embodiment, a real time request can be a request for an input, update, and/or data retrieval etc. For example, real time input module 106 can function as a calling application that communicates with source computer system 102 via network 108 to transmit search queries to, and receive results from, source computer system 102. In general, real time input module 106 can be implemented using a browser and web portal or any program that transmits search queries to, and receives results from, source computer system 102.

Master data management system 112 and big data entity resolution system 122 are responsible for analyzing big volumes of structured and unstructured data and storing that analysis. Master data management system 112 and big data entity resolution system 122 can process high volumes of information with low latency. For example, master data management system 112 and big data entity resolution system 122 can use text analytics, big data accelerators, probabilistic matching, statistical learning algorithms, and bulk extract to allow the same matching results to be used in multiple consuming systems, etc. Master data management system 112 and big data entity resolution system 122 comprise three layers, batch layer 114, view layer 118, and cache layer 124, as discussed in greater detail in FIG. 2.

Figure 2:
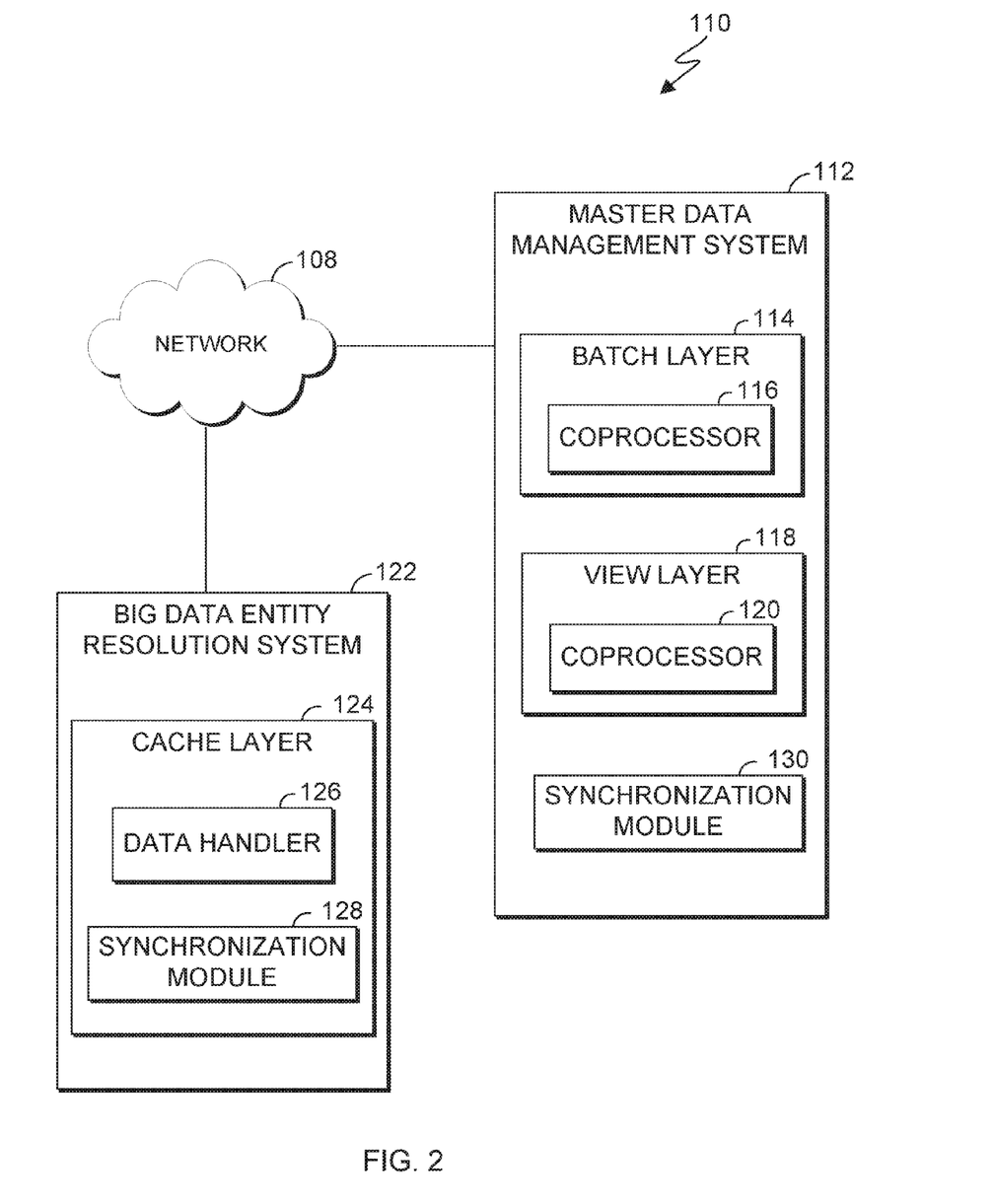
FIG. 2 is a block diagram of a big data enhanced master data management system, in accordance with an embodiment of the present invention.

FIG. 2 is a block diagram of certain components of big data enhanced MDM system 110, in accordance with an embodiment of the present invention.

Big data enhanced MDM system 110 further includes master data management system 112 and big data entity resolution system 122 connected by network 108 and comprises three layers: batch layer 114, view layer 118, and cache layer 124.

Master data management system 112 functions as a storage mechanism for big data and includes batch layer 114, view layer 118 and synchronization module 130. The term "big data" refers to large data sets that is typically processed in distributed parallel computing platforms. Batch layer 114 is arranged according to a computer architecture where receiving and computation processes by one or more components are performed according to big data equivalent of stored procedures on a relational database. For example, in a big data platform, stored procedure-like components (e.g., coprocessors) can run within the big data platform context and can be cached on a server side allowing for more flexible and secured access to data on each node.

In this embodiment, batch layer 114 includes coprocessor 116. Coprocessor 116 can perform data processing functions (e.g., suspect processing) and run batch processes such as receiving inputs from batch input module 104 and preparing data to be transmitted to view layer 118. In this embodiment, coprocessor 116 prepares data by using a probabilistic matching algorithm to parse through metadata (e.g., business key, data indexes, etc. on a big data repository), identify records of the same entity type (e.g., person, organization, etc.), and link multiple records based, at least in part, on entity type. In this embodiment, coprocessor 116 can perform these batch processes (e.g., via a derivation module invoked by coprocessor 116, not shown) in parallel across multiple data nodes (not shown) in a cluster. In this embodiment, coprocessor 116 can detect data changes (via a set of triggers) and initiate data processing procedures (via stored procedure-like routines). For example, coprocessor 116 can detect changes to multiple records of person A (e.g., records from 3 social media profiles) from batch input module 104, extract critical information from those multiple records, and link those multiple records for that entity (e.g., link the email address, city, state, number for the owner of those 3 social media profiles). The term "critical information", as used herein, refers to data elements for a particular entry, such as a person. Examples of critical information can include name, address, date of birth, social security number, etc.

View layer 118 is arranged according to a computer architecture where components of view layer 118 (e.g., coprocessor 120) merges linked data into a single view for a created entity. The term "view", as used herein, refers to a single representation of accumulated data for a particular entity (e.g., a person, business, group, etc.). For example, a view can comprise critical information of a person (e.g., name, address, date of birth, social security number, etc.). In instances where duplicative data (e.g., multiple entries for a person's date of birth) is retrieved from multiple sources (e.g., multiple social media websites), coprocessor 120 can merge the duplicative data. For example, where there are multiple entries for person A's date of birth that are the same (e.g., two social media websites display the same date of birth for person A), coprocessor can merge the duplicative data to display one date of birth for person A.

Coprocessor 120 receives linked records from coprocessor 116 and creates a single view for the linked records using survivorship rules which are targeted to retain only information appropriate to compose a trusted master record. The term, "survivorship rules", as used herein, refer to a set of procedures that determine which records will be retained in an entity among a bunch of records according to similarity. For example, the most recently updated record will be retained. In general, coprocessor 120 can be implemented with any observer coprocessor known in the art.

Continuing the above example, coprocessor 120 can merge the linked records of the three social media profiles A-C to create a single view. For example, social media profile A could contain a person's name and phone number, social media profile B could contain the person's current city, and social media profile C could contain the person's email. Coprocessor 120 can merge the linked records to create a single view for those 3 social media profiles. For example, the single view can be merged into a single digestible entity containing the relevant information extracted from the 3 social media profiles, such as the person's name, phone number, current city and email.

Coprocessor 120 can then assign the view an entity ID, a view ID, and accompanying metadata (e.g., creation date of the view, data node info, etc.) that corresponds to the created view.

An "entity ID", as used herein, refers to a unique identifier for an entity associated with the created view. In this embodiment, an entity ID can be a combination of numbers and letters. For example, in instances where an entity is a person (e.g., Carole), data handler 126 can assign Carole an entity ID of Carole001. In other embodiments, an entity ID can be one or more numbers assigned to a view. In general, an entity ID is any combination of numbers, letters, and/or symbols that serve as a unique identifier for an entity.

A "view ID", as used herein, refers to a unique identifier for a created view of an entity that resides on a view layer (e.g., view layer 118). Similar to an entity ID, a view ID can be any combination of numbers letters, and/or symbols that serve as a unique identifier for a view that resides on view layer 118. Continuing the example above, a view ID for Carole could be CaroleView001.

This single view can be exported by coprocessor 120 for registration in cache layer 124. In instances where multiple views have been created, metadata of previously indexed viewed are also cached.

Synchronization module 130 facilitates synchronization between master data management system 112 and big data entity resolution system 122 (e.g., between view layer 118 and cache layer 124). In general, synchronization module 130 can be implemented with any combination of software and hardware that has functional messaging capabilities.

Big data entity resolution system 122 includes cache layer 124, data handler 126, and synchronization module 128.

Cache layer 124 is arranged according to a computer architecture where real time inputs are received and processed to reflect the most recent version of records. For example, processes run on cache layer 124 register different views (i.e., create an index of the different views) created on view layer 118. Furthermore, processes run on cache layer 124 can store views created by view layer 118 according to survivorship rules (e.g., the most used views are persisted to cache layer 124 while the least used views are marked as deleted from cache layer 124 and persisted in view layer 118). Cache layer 124 includes data handler 126 and synchronization module 128.

Data handler 126 registers, updates, and retrieves views. In this embodiment, data handler 126 registers views by indexing the entity ID, view ID, and the accompanying metadata received from a created view. For example, data handler 126 can receive notification that a view was created for a new entity (e.g., Carole). Data handler 126 can store the entity ID (e.g., Carole001), view ID (e.g., CaroleView001), and accompanying metadata (e.g., created on Jan. 2, 2015 on data node 1).

In instances where data handler 126 receives a request to modify a view (e.g., when data handler 126 receives a new version of a view from view layer 118) data handler 126 can register the latest view, add the accompany metadata (e.g., create data, data node info, etc.), and update view details (e.g., cached view) for a given data entry. For example, data handler 126 can register a view, detect previous versions of a previously registered view, and responsive to detecting a previous registered view, update the registered view. Data handler 126 can also indicate that the updated registered view needs to be synchronized.

In some instances, data handler 126 stores the accompanying view with the index. For example, data handler 126 can use survivorship rules to cache the most used views in cache layer 124 for quick retrieval. Conversely, data handler 126 can use survivorship rules to mark the least used views as deleted.

In instances where data handler 126 receives a request to display a view, data handler 126 searches the index of registered views to see if a matching view has been cached on cache layer 124. Responsive to determining that a view matches a received request resides on cache layer 124, data handler 126 can display the matching view. Responsive to determining that the registered view does not have a persisted copy of the view on cache layer 124, data handler 126 can invoke synchronization module 128 to retrieve the matching view from view layer 118. Data handler 126 can then persist the matching view on cache layer 124. Accordingly, data handler 126 can return the requested view to a user.

Synchronization module 128 is the counterpart synchronization module of synchronization module 130 residing on big data entity resolution system 122 and facilitates synchronization between the different layers (e.g., cache layer 124 and view layer 118). In this embodiment, in a query transaction, synchronization module 128 can synchronize views between view layer 118 and cache layer 124. For example, synchronization module 128 can access a registered one or more views in view layer 118, compare the registered views, and merge the views in cache layer 124, as will be discussed in greater detail with regard to FIG. 7.

Figure 3:
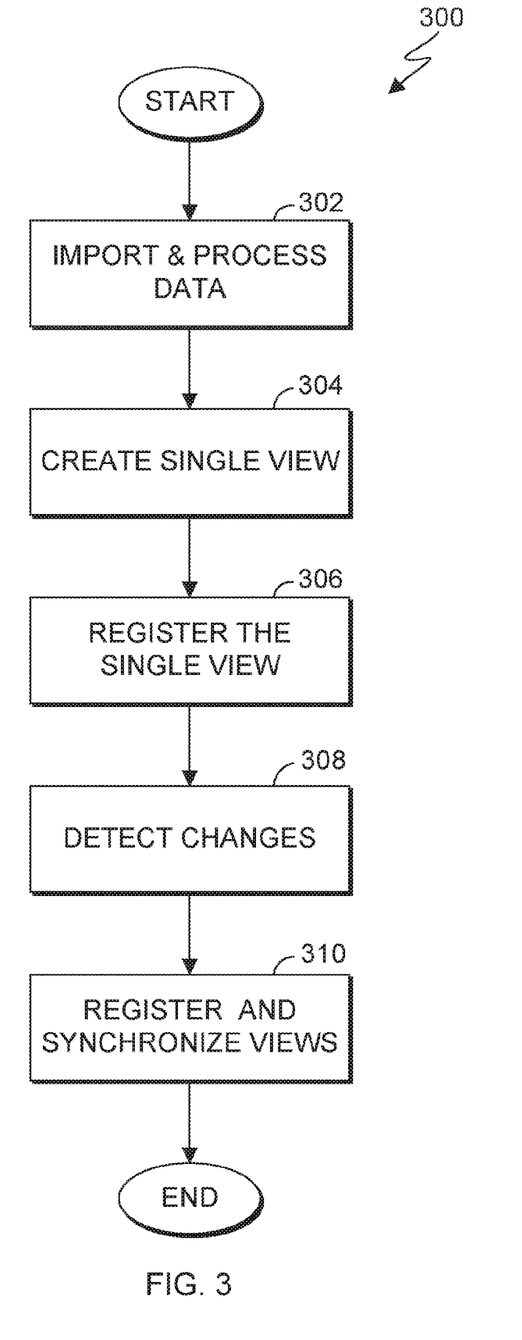
FIG. 3 is a flowchart illustrating operational steps for performing batch data processing, in accordance with an embodiment of the present invention.

FIG. 3 is a flowchart 300 illustrating operational steps for performing batch data processing, in accordance with an embodiment of the present invention. For illustrative purposes, the following discussion is made with regard to big data enhanced MDM system 110 performing a first instance of importing data, creating a single view for that data, and registering the created single view for the first time. However, it should be understood that big data enhanced MDM system 110 can import data, create a single view for that data, and register the view as an update, capable of being performed in real time.

In step 302, coprocessor 116 imports and processes data. In this embodiment, coprocessor 116 imports and processes the data by receiving data from batch input module 104, parsing through the data, and linking data to create an entry for the received data set. In this embodiment, coprocessor 116 processes data by using a probabilistic matching algorithm to parse through data, identify records of the same entity type (e.g., person, organization, etc.), and link multiple records based, at least in part, on entity type. For example, coprocessor 116 can receive multiple records (e.g., from 3 social media profiles) from batch input module 104, extract critical information (i.e., metadata) from those multiple records, and link those multiple records for that entity (e.g., link the email address, city, state, number for the owner of those 3 social media profiles) so that a search of one entity type (e.g., a person) retrieves those 3 social media profiles and the accompanying metadata associated with those 3 social media profiles. An example of a generated linked entry output is discussed in greater detail with regard to FIG. 4. (e.g., linked entry output 400).

In step 304, coprocessor 120 creates a single view of the data. In this embodiment, coprocessor 120 creates a single view of the linked metadata by assigning each data set an entity ID and a view ID for the linked metadata. For example, an entity ID for person 1 could be the person's name, such as Carole Doe, and the view ID could be CD001. Coprocessor 120 can then merge the linked metadata to a single view. For example, coprocessor 120 can merged the linked records of the three social media profiles A-C to create a single view. For example, social media profile A could contain a person's name and phone number, social media profile B could contain the person's current city, and social media profile C could contain the person's email. Coprocessor 120 can merge the linked records to create a single view for those 3 social media profiles (e.g., single view output 500, as discussed in relation to FIG. 5). Coprocessor 120 then alerts synchronization module 128 to register the created view at cache layer 124. Accordingly, synchronization module 130 invokes data handler 126 to handle the registration.

In step 306, data handler 126 registers the single view. In this embodiment, data handler 126 registers the single view in a table. For example, data handler 126 creates a view index for the created view by storing the registration ID and view ID and accompanying metadata (e.g., creation date, file size, data node info, etc.). In other embodiments, data handler 126 can register the single view in any suitable storage architecture known in the art (e.g., a relational tree, etc.).

In step 308, data handler 126 detects a change in the registered view. In this embodiment, data handler 126 detects a change in a registered view responsive to receiving an indication from synchronization module 130 that a view has changed. In this embodiment data handler 126 can also detect a change in the registered view responsive to receiving an input value from one or more other components of computing environment 100.

For example, data handler 126 could have registered view 1 and registered view 1 contains entity ID 001 for a person named Carole. Registered view 1 for Carole contains the following information: Address, 123 Main St., City, Toronto.

Coprocessor 120 of master data management system 112 could receive an updated input value for entity ID 001 changing the address to 456 Broadway Ave in Montreal.

In step 310, data handler 126 registers and synchronizes the views. In this embodiment, data handler 126 registers and synchronizes the views responsive to receiving an indication from synchronization module 130 that a view has changed. Continuing the example above, responsive receiving an indication from synchronization module 130 that a registered view (e.g., entity ID001) needs to be updated, data handler 126 registered the updated view. For example, data handler 126 can update the registered view from registered view 1 to registered view 2 for entity ID001.

In instances where a transaction is performed (e.g., an add/update/delete transaction), data handler 126 persists the update as a new view in cache layer 124 and synchronization module 128 synchronizes the data with view layer 118. In this embodiment, synchronization module 128 can synchronize data according to usage patterns of respective data responsive to reaching or exceeding a cache size limit for cached views. For example, the most often used data will be cached in cache layer 124. Conversely, the least used data will be migrated (via data handler 126) to the view layer 118 to be persisted. Accordingly, synchronization module 128 can initiate a synchronization with view layer 118 to persist views previously residing on cache layer 124. In other embodiments, the synchronization can be set to any user-defined time interval. For example, synchronization module 128 can sync at regular intervals (e.g., every five minutes, 10 minutes, 30 minutes, etc.).

In instances where big data enhanced MDM system 110 receives a query for a view retrieval, data handler 126 can retrieve the latest view and display the latest view. In this embodiment, data handler 126 displays the latest view by searching the created index of registered views and determining whether a view resides on cache layer 124. Responsive to determining that a view resides on cache layer 124, data handler 126 retrieves the view and displays it. Where a view is not found in cache layer 124, data handler 126 can access a copy of the view residing on view layer 118, persist it in cache layer 124, and return it to the user (via a display).

Figure 4:
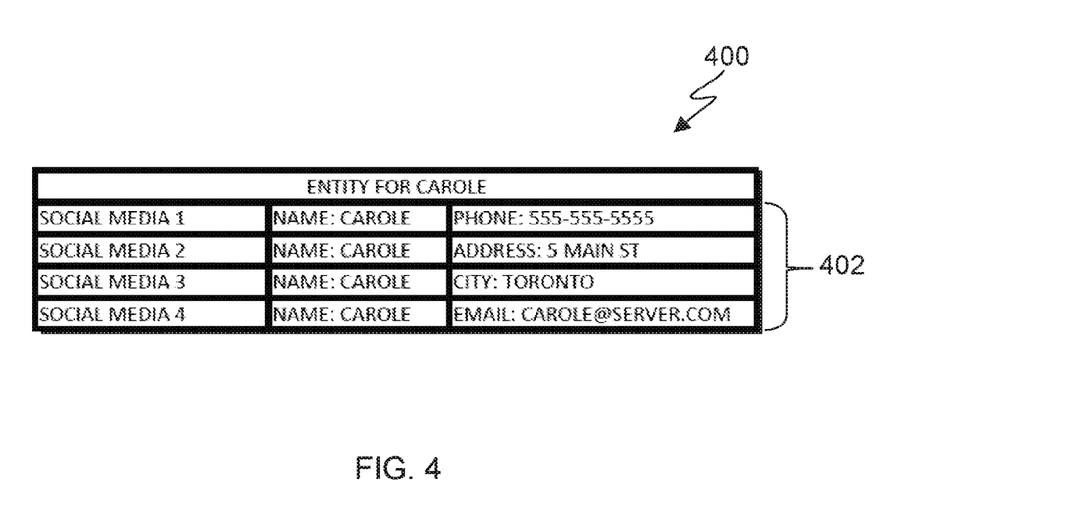
FIG. 4 is an example of a linked entry output, in accordance with an embodiment of the present invention.

FIG. 4 is an example of linked entry output 400, in accordance with an embodiment of the present invention. For example, linked entry output 400 could be generated at step 302 of flowchart 300.

In this example, coprocessor 116 has imported data for an individual named Carole. Coprocessor 116 then parsed through the imported data to extract entity data 402. In this example, entity data 402 includes metadata such as a phone number (e.g., 555-555-5555), address (e.g., 5 Main St), city (e.g., Toronto), and email (e.g., Carole@server.com) of an individual named Carole from social media 1 through 4, respectively. Coprocessor 116 then links metadata associated with social media 1 through 5 together to generate linked entry output 400 so that a query for Carole will retrieve the metadata associated with social media 1 through 5.

Figure 5:
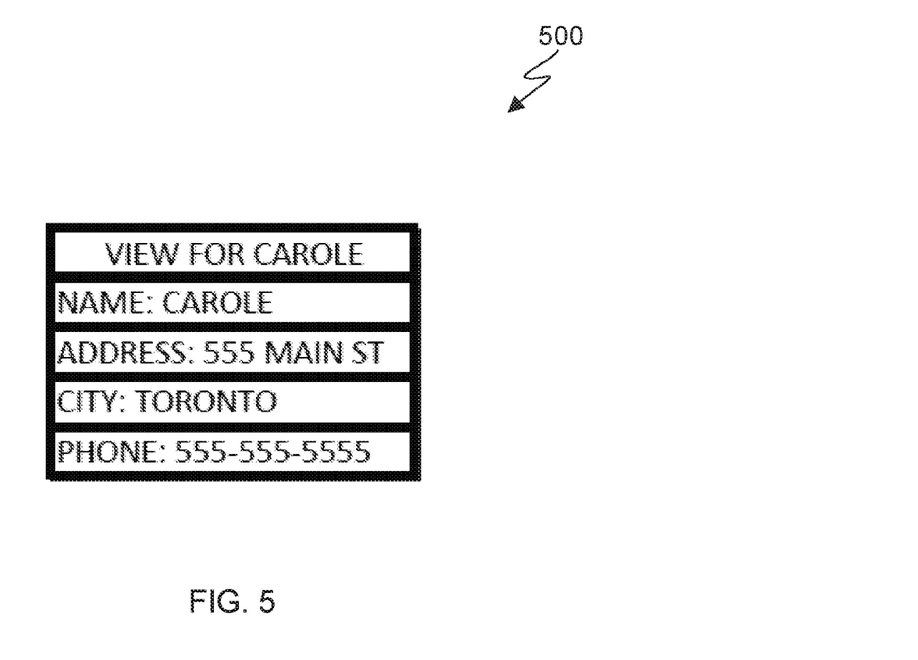
FIG. 5 is an example of a single view output, in accordance with an embodiment of the present invention.

FIG. 5 is an example of single view output 500, in accordance with an embodiment of the present invention. For example, single view output 500 can be generated from linked entry output 400.

In this example, coprocessor 120 receives linked profile data (e.g., entity data 402) from coprocessor 116 and creates single view output 500 from previously linked metadata, which effectively deletes duplicative profile data.

Figure 6:
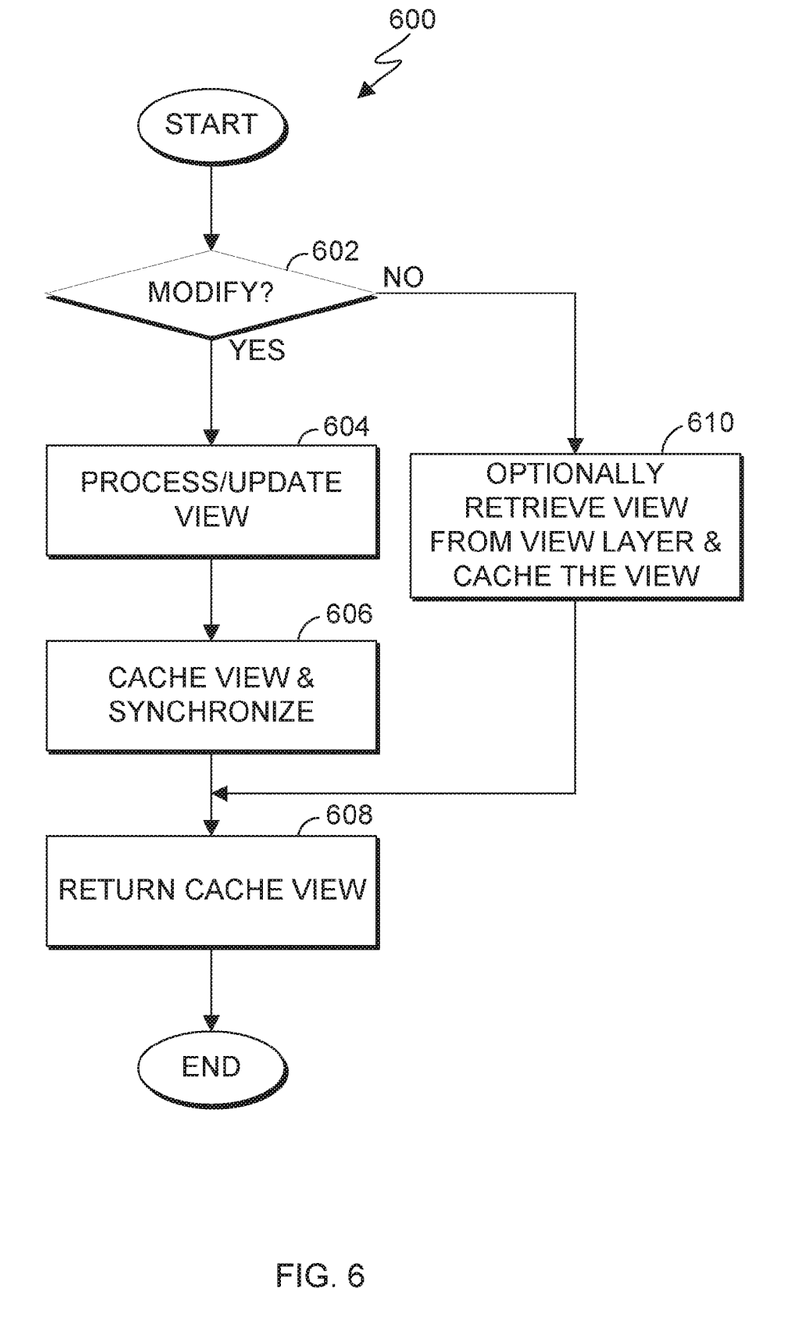
FIG. 6 is a flowchart illustrating operational steps for performing a real time data request, in accordance with another embodiment of the present invention.

FIG. 6 is a flowchart 600 illustrating operational steps for performing a real time data request, in accordance with another embodiment of the present invention. For illustrative purposes, the following discussion is made with respect to data handler 126 processing a received request to modify a view that has been cached in cache layer 124. However, it should be understood that data handler 126 can receive a request to modify or otherwise retrieve a view that has not been cached in cache layer 124.

In step 602, data handler 126 determines whether a view needs to be modified. In this embodiment, data handler 126 determines whether or not to modify a view based, at least in part, on a received data request from real time input module 106. For example, a data request can include instructions to delete the view, update the view, or retrieve a view from either view layer 118 or cache layer 124.

If, in step 602, data handler 126 determines that a view needs to be modified then, in step 604 data handler 126 processes the request and updates the view based, at least in part, on the data request. As previously discussed, a data request can include instructions to delete the view, update the view, or retrieve a view from either view layer 118 or cache layer 124.

In instances where the data requests includes instructions to delete the view (e.g., data contained in the view such as entity name, date of birth, social security, address, etc.) handler 126 can mark the view data as deleted from cache layer 124 which, effectively deletes the view. Accordingly, the view marked as deleted from cache layer 124 may still be kept as historical data and can still be used for history tracking purposes.

Where the data request includes instructions to update the view, then data handler 126 can process the request and make the changes to update the view. For example, the data request could contain instructions to update the address for an individual associated with a registered view. Responsive to determining that a modification needs to be made, data handler 126 can update the address for an individual associated with the registered view. For example, a previous registered view could contain a no longer valid address 123 Main St. Data handler 126 can update the address to 456 Archer St.

In step 606, data handler 126 stores the update in cache layer 124 and synchronizes the views. In this embodiment, data handler 126 stores the updated view in cache layer 124, updates the registered view (e.g., indexes the changed view), and marks the view to indicate that a synchronization between cache layer 124 and view layer 118 needs to occur. Accordingly, synchronization module 128 synchronizes between the cached view stored in view layer 118 and the persisted view in cache layer 124 to reflect the changes in cache layer 124.

In step 608, data handler 126 returns the updated view to real time input module 106. In instances where data handler 126 has not received instructions to modify a registered view, data handler 126 can access the registered view in cache layer 124 and return the requested view to real time input module 106.

If, in step 602, data handler 126 determines that a view does not need to be modified then, in step 610, data handler 126 can optionally retrieve a version stored of a previous registered view from view layer 118. Data handler 126 can then cache the retrieved view (from view layer 118) that matches the data request in cache layer 124. Data handler 126 can then return the retrieved view to real time input module 106.

Figure 7:
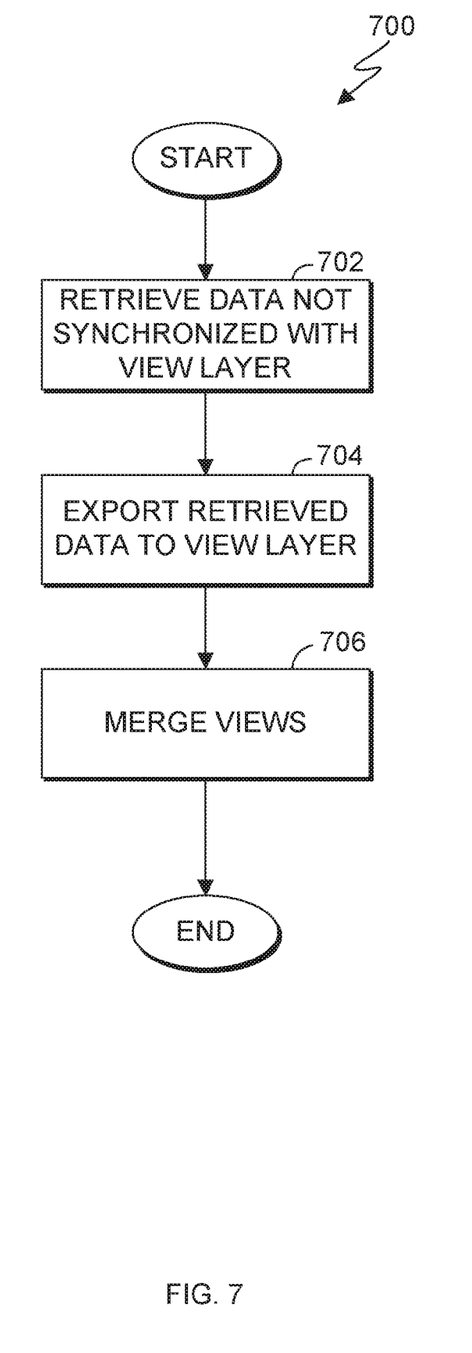
FIG. 7 is a flowchart illustrating operational steps for performing a synchronization, in accordance with another embodiment of the present invention.

FIG. 7 is a flowchart 700 illustrating operational steps for performing a synchronization, in accordance with another embodiment of the present invention. For example, the operational steps of flowchart 700 can be performed at step 310 of flowchart 300. For illustrative purposes, the following discussion is made with respect to a real time synchronization between a cache layer and a view layer from a received modification to a view on a cache layer. However, it should be understood that the synchronization can occur from a view layer to a cache layer.

In step 702, synchronization module 128 retrieves data not synchronized with view layer 118. In this embodiment, synchronization module 128 retrieves data associated with a received update in cache layer 124. For example, in instances when a view is updated on a cache layer (e.g., cache layer 124), a message including the registered view is sent from data handler 126 to synchronization module 128 to synchronize with view layer 118.

In other instances where real time data is cached on the cache layer (e.g., cache layer 124) and has reached a specified cache limit, data handler 126 can invoke synchronization module 128 to notify synchronization module 130 to retrieve the cached data and persist the cached data in the view layer (e.g., view layer 118). For example, when a specified cache limit is reached, data handler 126 can identify which views cached in cache layer 124 are no longer used due to one or more criteria indicating inactivity.

In step 704, synchronization module 128 exports retrieved data to view layer 118. In this embodiment, synchronization module 128 exports retrieved data associated with the updated view (e.g., a change in address to an entity) to view layer 118 via network 108 after batch processing in batch layer 114 terminates. For example, where the update was performed on cache layer 124 to an entity's address, synchronization module 128 can export that change to update (i.e., synchronize) the view stored in view layer 118.

In instances where a delete instruction was performed, responsive to reaching a specified threshold on cache layer 124, data handler 126 can mark the inactive view as deleted and invoke synchronization module 128 to persist the inactive view in view layer 118. Accordingly, synchronization module 128 and synchronization module 130 communicate to persist the inactive view to view layer 118.

In step 706, synchronization module 128 merges views from cache layer 124 to view layer 118. In this embodiment, synchronization module 128 merges views from cache layer 124 to view layer 118 by comparing the changes to the metadata residing in cache layer 124 against the metadata residing in view layer 118, loading the view from cache layer 124, and replacing the previous view residing on view layer 118 with the view from cache layer 124.

Figure 8:
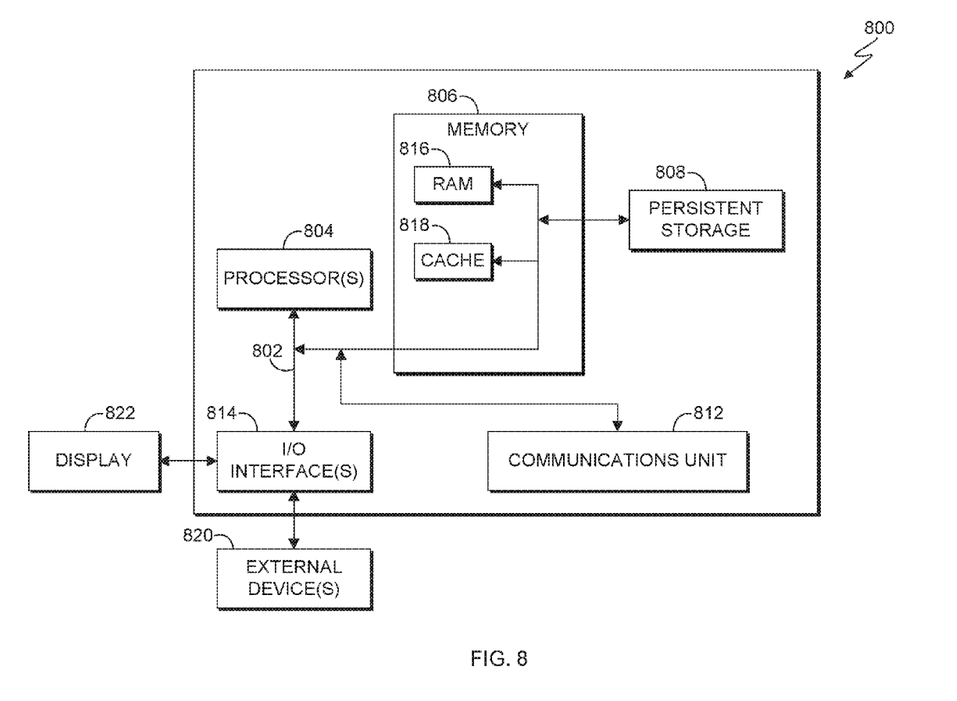
FIG. 8 is a block diagram of internal and external components of the computer systems of FIG. 1, in accordance with an embodiment of the present invention.

FIG. 8 is a block diagram of internal and external components of a computer system 800, which is representative of the computer systems of FIG. 1, in accordance with an embodiment of the present invention. It should be appreciated that FIG. 8 provides only an illustration of one implementation and does not imply any limitations with regard to the environments in which different embodiments may be implemented. In general, the components illustrated in FIG. 8 are representative of any electronic device capable of executing machine-readable program instructions. Examples of computer systems, environments, and/or configurations that may be represented by the components illustrated in FIG. 8 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 800 includes communications fabric 802, which provides for communications between one or more processors 804, memory 806, persistent storage 808, communications unit 812, and one or more input/output (I/O) interfaces 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 816 and cache memory 818. In general, memory 806 can include any suitable volatile or non-volatile computer-readable storage media. Software is stored in persistent storage 808 for execution and/or access by one or more of the respective processors 804 via one or more memories of memory 806.

Persistent storage 808 may include, for example, a plurality of magnetic hard disk drives. Alternatively, or in addition to magnetic hard disk drives, persistent storage 808 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 808 can also be removable. For example, a removable hard drive can be used for persistent storage 808. Other examples include optical and magnetic disks, thumb drives, and smart cards that are inserted into a drive for transfer onto another computer-readable storage medium that is also part of persistent storage 808.

Communications unit 812 provides for communications with other computer systems or devices via a network (e.g., network 108). In this exemplary embodiment, communications unit 812 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 812 (e.g., via the Internet, a local area network or other wide area network). From communications unit 812, the software and data can be loaded onto persistent storage 808.

One or more I/O interfaces 814 allow for input and output of data with other devices that may be connected to computer system 800. For example, I/O interface 814 can provide a connection to one or more external devices 820 such as a keyboard, computer mouse, touch screen, virtual keyboard, touch pad, pointing device, or other human interface devices. External devices 820 can also include portable computer-readable storage media such as, for example, thumb drives, portable optical or magnetic disks, and memory cards. I/O interface 814 also connects to display 822.

Display 822 provides a mechanism to display data to a user and can be, for example, a computer monitor. Display 822 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
importing, from a plurality of sources, a large data set to a batch layer, by one or more processors of a computer system comprising the batch layer, a view layer, and a cache layer, wherein the batch layer continually imports large data sets, parses through data, classifies data by type, and detects changes to the parsed data, wherein the view layer links data classified by type, and wherein the cache layer receives real time input;
identifying, by one or more processors, a subset of critical information from the imported large data set common to a single entity;
creating, by the one or more processors, a view in the view layer for the single entity that depicts the subset of the imported large data set;
copying, by one or more processors, the view in the view layer to the cache layer;
retrieving, by one or more processors, the copied view concurrently handling batch processing, wherein batch processing comprises:
continually importing, from a plurality of sources, a large data set to a batch layer,
parsing through the imported data,
classifying data by data type, and
detecting changes to the parsed data; and
increasing, by one or more processors, efficiency and accuracy of retrieval of the copied view at the cache layer based on a frequency of use of the copied view, wherein:
accuracy of the copied view is ensured by updating the copied view with newly identified subsets of critical information in real time while batch processing,
efficiency of retrieval of the copied view is ensured in real time by the frequency of use of the copied view stored in the cache layer, wherein the copied view is marked as deleted in response to determining the frequency of use of the copied view falls below a frequency of use threshold, and
wherein an updated version of the copied view is stored in the view layer in response to an update performed by the batch layer as a result of batch processing or in response to a user request to change at least a portion of the subset depicted in the view at the view layer.

2. The method of claim 1, wherein importing, from a plurality of sources, a large data set to a batch layer, by one or more processors of a computer system comprising the batch layer, a view layer, and a cache layer comprises:
identifying, by the one or more processors, metadata associated with the plurality of sources; and
linking, by the one or more processors, subsets of metadata from different sources based, at least in part, on relevancy to an entity.

3. The method of claim 2, wherein:
the plurality of sources comprise a plurality of social media services; and
the entity is a user of each of the plurality of social media services.

4. The method of claim 2, wherein creating, by the one or more processors, a view in the view layer for the single entity that depicts the subset of the imported large data set comprises:
merging, by one or more processors, the linked subsets of metadata to form a view; and
registering, by one or more computer processors, the view in the view layer.

5. The method of claim 1, wherein increasing, by one or more processors, efficiency and accuracy of retrieval of the copied view at the cache layer based on a frequency of use of the copied view comprises:
updating, by one or more processors, the copied view at the cache layer based, at least in part, on a user request to change at least a portion of the subset depicted in the view at the view layer;
updating, by one or more processors, the copied view at the cache layer, based on new subsets of critical information imported to the batch layer deemed relevant to the copied view;
synchronizing, by one or more processors, the updated copy of the view of the cache layer with the view at the view layer;
determining, by one or more processors, to delete the view from the cache layer; and
responsive to determining to delete the view from the cache layer, marking, by one or more processors, the view in the cache layer as deleted.

6. The method of claim 5, further comprising:
identifying, by one or more processors, a frequency of use of the view at the view layer; and
responsive to determining a low frequency of use of the view at the view layer, determining, by one or more processors, to delete the view from the view layer.

7. The method of claim 5, further comprising:
responsive to receiving a request to retrieve a previous version of the view, determining, by one or more processors, that the previous version of the view is not located in the cache layer;
responsive to determining that the previous version of the view is not located in the cache layer, identifying, by one or more processors, that a copy of the previous version of the view exists in the view layer; and
copying, by one or more processors, the identified copy of the previous version of the view in the view layer to the cache layer.

8. A computer program product comprising:
one or more non-transitory computer readable storage media and program instructions stored on the one or more non-transitory computer readable storage media, the program instructions executed by one or more computer processors to perform:
importing, from a plurality of sources, a large data set to a batch layer, by one or more processors of a computer system comprising the batch layer, a view layer, and a cache layer, wherein the batch layer continually imports large data sets, parses through data, classifies data by type, and detects changes to the parsed data, wherein the view layer links data classified by type, and wherein the cache layer receives real time input;
identifying, by one or more processors, a subset of critical information from the imported large data set common to a single entity;
creating, by the one or more processors, a view in the view layer for the single entity that depicts the subset of the imported large data set;

copying the view in the view layer to the cache layer;
retrieving of the copied view concurrently handling batch processing, wherein batch processing comprises:
continually importing from a plurality of sources, a large data set to a batch layer,
parsing through the imported data,
classifying data by data type, and
detecting changes to the parsed data; and
increasing efficiency and accuracy of retrieval of the copied view at the cache layer based on a frequency of use of the copied view, wherein:
accuracy of the copied view is ensured by updating the copied view with newly identified subsets of critical information in real time while batch processing,
efficiency of retrieval of the copied view is ensured in real time by the frequency of use of the copied view stored in the cache layer, wherein the copied view is marked as deleted in response to determining the frequency of use of the copied view falls below a frequency of use threshold, and
wherein an updated version of the copied view is stored in the view layer in response to an update performed by the batch layer as a result of batch processing or in response to a user request to change at least a portion of the subset depicted in the view at the view layer.

9. The computer program product of claim 8, wherein importing from a plurality of sources, a large data set to a batch layer, by one or more processors of a computer system comprising the batch layer, a view layer, and a cache layer comprise:
identifying metadata associated with the plurality of sources; and
linking subsets of metadata from different sources based, at least in part, on relevancy to an entity.

10. The computer program product of claim 9, wherein:
the plurality of sources comprise a plurality of social media services; and
the entity is a user of each of the plurality of social media services.

11. The computer program product of claim 9, wherein creating a view in the view layer for the single entity that depicts the subset of the imported large data set comprise:
merging the linked subsets of metadata to form a view; and
registering the view in the view layer.

12. The computer program product of claim 8, wherein increasing efficiency and accuracy of retrieval of the copied view at the cache layer based on a frequency of use of the copied view comprises comprise:
updating the copied view at the cache layer based, at least in part, on a user request to change at least a portion of the subset depicted in the view at the view layer;
updating the copied view at the cache layer, based on new subsets of critical information imported to the batch layer deemed relevant to the copied view;
synchronize the updated copy of the view of the cache layer with the view at the view layer;
determining to delete the view from the cache layer; and
responsive to determining to delete the view from the cache layer, marking the view in the cache layer as deleted.

13. The computer program product of claim 12, wherein the program instructions stored on the one or more computer readable storage media further comprise:
identifying a frequency of use of the view at the view layer; and
responsive to determining a low frequency of use of the view at the view layer, determining to delete the view from the view layer.

14. The computer program product of claim 12, wherein the program instructions stored on the one or more computer readable storage media executed by the one or more processors further comprise:
responsive to receiving a request to retrieve a previous version of the view, determining that the previous version of the view is not located in the cache layer;
responsive to determining that the previous version of the view is not located in the cache layer, identifying that a copy of the previous version of the view exists in the view layer; and
copying the identified copy of the previous version of the view in the view layer to the cache layer.

15. A computer system comprising:
one or more computer processors;
one or more computer readable storage media; and
program instructions stored on the one or more computer readable storage media for execution by at least one of the one or more computer processors, the program instructions comprising:
importing, from a plurality of sources, a large data set to a batch layer, by one or more processors of a computer system comprising the batch layer, a view layer, and a cache layer, wherein the batch layer continually imports large data sets, parses through data, classifies data by type, and detects changes to the parsed data, wherein the view layer links data classified by type, and wherein the cache layer receives real time input;
identifying, by one or more processors, a subset of critical information from the imported large data set common to a single entity;
creating, by the one or more processors, a view in the view layer for the single entity that depicts the subset of the imported large data set;
copying the view in the view layer to the cache layer;
retrieving the copied view concurrently handling batch processing, wherein batch processing comprises:
continually importing, from a plurality of sources, a large data set to a batch layer,
parsing through the imported data,
classifying data by data type, and
detecting changes to the parsed data; and
increasing efficiency and accuracy of retrieval of the copied view at the cache layer based on a frequency of use of the copied view, wherein:
accuracy of the copied view is ensured by updating the copied view with newly identified subsets of critical information in real time while batch processing,
efficiency of retrieval of the copied view is ensured in real time by the frequency of use of the copied view stored in the cache layer, wherein the copied view is marked as deleted in response to determining the frequency of use of the copied view falls below a frequency of use threshold, and
wherein an updated version of the copied view is stored in the view layer in response to an update performed by the batch layer as a result of batch processing or in response to a user request to change at least a portion of the subset depicted in the view at the view layer.

16. The computer system of claim 15, wherein importing from a plurality of sources, a large data set to a batch layer, by one or more processors of a computer system comprising the batch layer, a view layer, and a cache layer comprise:
- identifying metadata associated with the plurality of sources; and
- linking subsets of metadata from different sources based, at least in part, on relevancy to an entity.

17. The computer system of claim 16, wherein creating a view in the view layer for the single entity that depicts the subset of the imported large data set comprise:
- merging the linked subsets of metadata to form a view; and
- registering the view in the view layer.

18. The computer system of claim 15, wherein increasing efficiency and accuracy of retrieval of the copied view at the cache layer based on a frequency of use of the copied view comprises comprise:
- updating the copied view at the cache layer based, at least in part, on a user request to change at least a portion of the subset depicted in the view at the view layer;
- updating the copied view at the cache layer, based on new subsets of critical information imported to the batch layer deemed relevant to the copied view;
- synchronize the updated copy of the view of the cache layer with the view at the view layer;
- determining to delete the view from the cache layer; and
- responsive to determining to delete the view from the cache layer, marking the view in the cache layer as deleted.

19. The computer system of claim 18, wherein the program instructions stored on the one or more computer readable storage media executed by the one or more processors further comprise:
- identify a frequency of use of the view at the view layer; and
- responsive to determining a low frequency of use of the view at the view layer, determine to delete the view from the view layer.

20. The computer system of claim 18, wherein the program instructions stored on the one or more computer readable storage media executed by the one or more processors further comprise:
- responsive to receiving a request to retrieve a previous version of the view, determining that the previous version of the view is not located in the cache layer;
- responsive to determining that the previous version of the view is not located in the cache layer, identifying that a copy of the previous version of the view exists in the view layer; and
- copying the identified copy of the previous version of the view in the view layer to the cache layer.

* * * * *